Jan. 18, 1966  A. H. EMERY III  3,229,515
HYDROELECTRIC LOAD CELL AND SYSTEM
Filed July 5, 1962  2 Sheets-Sheet 1

INVENTOR
Albert Hamilton Emery, III
BY
Blair + Buckles
ATTORNEYS

Jan. 18, 1966  A. H. EMERY III  3,229,515
HYDROELECTRIC LOAD CELL AND SYSTEM
Filed July 5, 1962  2 Sheets-Sheet 2
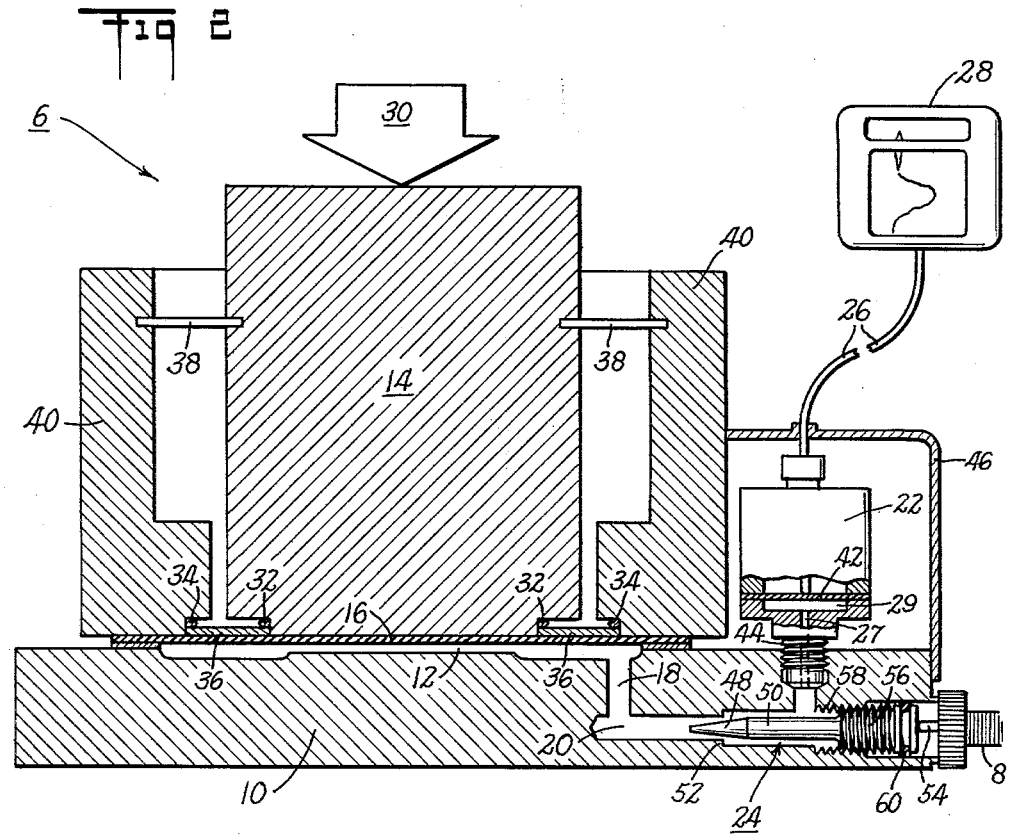
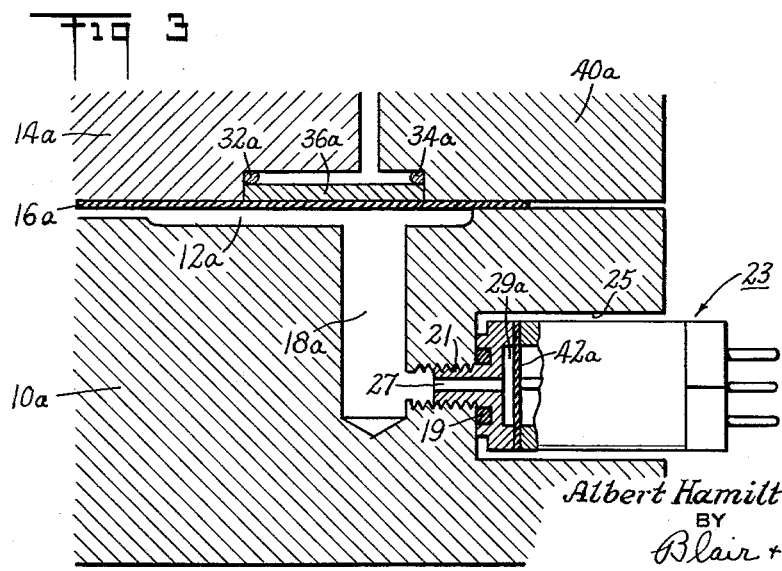
INVENTOR
Albert Hamilton Emery, III
BY
Blair + Buckles
ATTORNEYS 3,229,515
HYDROELECTRIC LOAD CELL AND SYSTEM
Albert Hamilton Emery III, Darien, Conn., assignor to
The A. H. Emery Company, New Canaan, Conn.
Filed July 5, 1962, Ser. No. 207,750
1 Claim. (Cl. 73—141)

This invention relates to improvements in load cells and load cell systems, and more particularly to a hydraulic load cell which transmits force or load information as an electrical signal and which transmits the information in more usable form.

Hydraulic load cells have been in use for some time and generally can be described as instruments which measure force or load information by means of hydraulic pressure. These load cells have a variety of applications and may be used in many types of weighing, such as in truck platforms, hopper weighing, tanks, railroad cars and a myriad of other weighing applications. Further, these load cells have found wide application in testing machines such as for the determination of tensile, crushing or shear strength of a specimen. Still another extensive use of these load cells is for thrust measurements of aircraft and rocket engines whereby the force generated by the engine can be readily measured by hydraulic pressure in a load cell or load cell system supporting an engine test stand.

There are some drawbacks in the prior art load cells however, which my invention obviates. Instrumentation for hydraulic load cells in the past has generally required hydraulic lines of considerable length for transmission of the hydraulic pressure to an indicator. In the indicator there are one or more diaphragms or Bourdon tubes for translation of hydraulic pressure into force or weight indications on an indicating or recording instrument. With the extensive use of long hydraulic lines, particularly where vibration is present, likelihood of leakage is greatly increased since there are a number of associated fittings and seals required in such a system.

Remote hydraulic weight or force indicators also pose a problem because of a time lag in response from the load cell to the indicator. The longer the hydraulic line the greater the time lag in pressure sensing at the indicator, resulting in inaccurate readings. This problem is particularly important in such applications as jet and rocket engine testing where the forces generated by the engine, and force changes, may require responses of under one millisecond. In such applications remote hydraulic indicators have definite disadvantages.

In some applications it may be undesirable to record sudden pressure fluctuations, since an averaged pressure may be required at the readout indicators. Therefore another problem present in these prior art load cells and hydraulic load cell systems involves the output of a "hashed" signal when there are sudden changes in the force applied. It is therefore very desirable to provide a variable pressure response, to average the pressure for readout. Further, sudden changes in hydraulic pressure may rupture diaphragms or cause leaks at the indicator fittings.

With remote hydraulic indication longer hydraulic lines also require more fluid in the system thus requiring greater piston deflection for a given load or force. This increase in piston deflection lowers the resonant frequency of the load cell and in some applications can be a considerable problem. The resonant or natural frequency of the load cell should be different from the frequency encountered in the testing range, and this is particularly important in jet and rocket engine testing since dynamic forces passing through the resonant frequency of the cell result in inaccurate force readings and may also damage the load cell system or associated equipment. Therefore, in many applications it is desirable to vary the frequency of the load cell system to avoid any prolonged operation at the resonant frequency.

Another problem in the use of remote hydraulic indicators is that the load cell system is more prone to error by ambient temperature variations around the system. Thus, for example, the temperature at or near the load cell may vary substantially from the temperature of the hydraulic fluid in the indicator lines and indicator itself. While some temperature compensation can be built into the load cell, variations in temperature from the cell to the remote indicator are much more difficult to compensate.

Accordingly, it is an object of the invention to provide a hydroelectric load cell having an electrical output.

Another object of the invention is to provide a load cell of the above character which is dependable in operation under a variety of operating conditions.

A further object of the invention is to provide a load cell of the above character wherein the response time of the cell may be varied.

Another object of the invention is to provide a load cell of the above character wherein the resonant frequency of the cell may be varied.

A further object of the invention is to provide a load cell of the above character which may be used in a variety of weight and force measuring applications.

Another object of the invention is to provide systems incorporating load cells of the above character.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claim.

For a fuller understanding of the nature and objects of the invention, reference should be had to the following detailed description taken in connection with the accompanying drawings.

FIGURE 2 is a schematic side view in partial section of my hydroelectric load cell.

FIGURE 3 is a partial schematic side view in partial section, of another embodiment of my invention.

Figure 1:
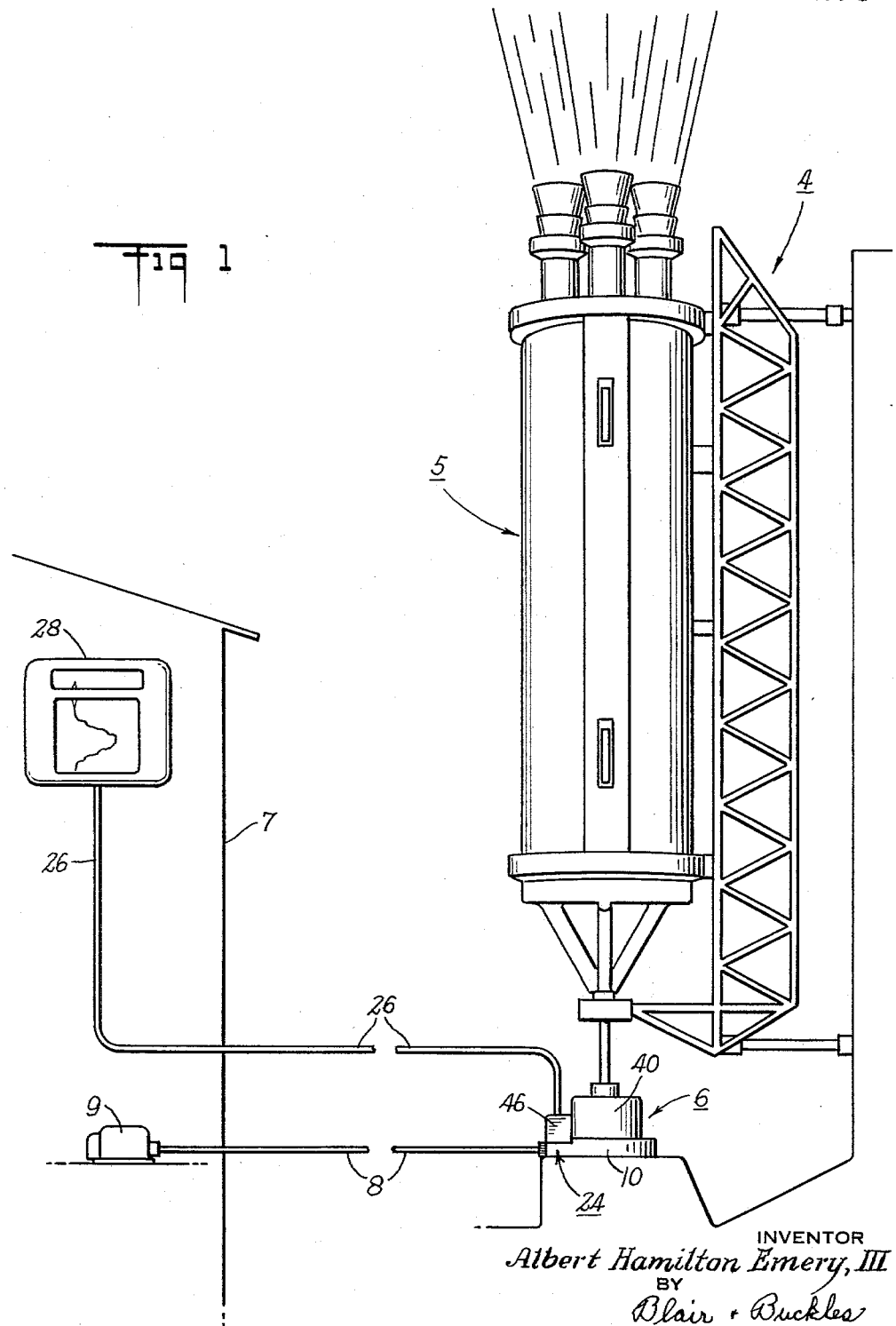
FIGURE 1 is a schematic side view of a rocket engine test stand employing my hydroelectric load cell system.

A typical application of my hydroelectric load cell and system is shown in FIGURE 1, wherein a rocket engine 5 is undergoing thrust testing. The thrust force is measured by my load cell 6 and the force measurements are transmitted to a recorder 28. In such applications as this, my hydroelectric load cell is particularly useful as will be more fully explained hereinafter.

In general FIGURE 2 shows my hydroelectric load cell having a base portion 10 which may be of steel or some other suitable metal. A fluid cavity 12 is formed in the base 10, the fluid therein being compressed by a piston 14 through a diaphragm 16. Fluid pressure in cavity 12 is transmitted through passages 18, 20 to a transducer 22 which translates hydraulic pressure into an electrical signal. In the preferred embodiment of my invention the passage 20 may be variably constricted by a needle valve assembly 24. The electrical output of transducer 22 is transmitted by a cable 26 to an electrical readout or recording indicator 28 which may be located remotely from the hydroelectric load cell.

In the embodiment shown in FIGURE 3 the vertical passage 18a from cavity 12a joins directly to coupling 21 of a transducer 23 which may be embedded in a hole or groove 25 at the side of the base 10a.

An O-ring 19 is used to seal the transducer connection into the cell base 10a. A constricted passage 27 through fitting 21 provides fluid communication with the fluid cavity 12a in the load cell base. The constricted passage 27 opens into a chamber 29a adjacent the transducer diaphragm 42a and tends to average out sudden changes in hydraulic pressure before the pressure is applied to diaphragm 42a. It should be understood that the embodiment shown in FIGURE 3 may be used in applications where the size of passage 27 may be of a predetermined diameter to average out sudden pressure changes or for other desired effects.

Referring now to FIGURE 1, it will be seen that a rocket engine test stand 4 supports a rocket engine 5 for free vertical movement during thrust testing. A hydroelectric load cell 6, as shown in FIGURE 2 is positioned below the rocket engine to take the engine thrust.

Instrumentation for the testing system is preferably remotely located in a block house 7 and includes a recorder 28 as well as a number of other instruments (not shown) which measure vibration, fuel flow, etc. A cable 26 carries thrust information electrically from the load cell 6 to the block house. Control of needle valve assembly 24 is effected through a flexible cable 8 which may be driven by a selsyn motor 9 in the block house. In some applications motor 9 may be located near the load cell 6 and be operated electrically by selsyn control from the block house. In those applications where the block house 7 can be safely located near the rocket test stand valve 24 may be manually controlled through cable 8.

Referring now to FIGURE 2 my hydroelectric load cell will be described more specifically. Arrow 30 represents a downward force on piston 14 which transmits this force through pivot wires 32, 34 to a bridge ring 36 to deflect diaphragm 16 and transmit the force to the hydraulic fluid in the cavity 12. The piston 14 is maintained in a vertical position by a stayplate 38 adjacent its upper end, the stayplate being held firmly in the cylinder casing 40 to prevent lateral displacement of the piston. As the hydraulic fluid pressure in cavity 12 increases the pressure is transmitted through passages 18, 20 and subsequently to the transducer diaphragm 42 after passing through the valve assembly 24 and fitting 44 via passage 27 which connects to the transducer fluid chamber 29. When mounted as shown in FIGURE 2 the transducer 22 is preferably provided with a cover 46 to protect it from dust or damage when in use.

The valve assembly as illustratively shown may comprise a tapered end portion 48 of a rod 50 which is substantially centered in shoulder portion 52 of passage 20. The tapered end 48 is moved in and out of the shoulder portion 52 by turning cable 54 to move the rod 50 axially by engagement of threads 56 with threaded portion 58 of passage 20. Thus the rate of flow or transmission of pressure through passage 20 can be controlled by the positioning of end 48 into the shoulder or valve seat 52 as required. An O-ring 60 is preferably used to seal the valve assembly against leakage when operating under high pressure.

The variable restriction afforded by the valve assembly 24 will greatly reduce "hashed" signals when the force 30 applied to the piston is rapidly changing, such as in jet or rocket testing as pointed out above. In such cases the hydraulic fluid may be rapidly pulsing, which makes it very difficult to obtain an intelligible force reading at the recorder 28. Thus the restricting valve assembly 24 tends to smooth out such "hashed" signals to give an average force reading. In those instances where it is desirable to record instantaneous fluctuations the valve may be opened fully for transmission of these pressure pulses to the transducer diaphragm 42.

The problem of natural or resonant frequencies of weighing or force measuring systems is also obviated by my invention. In tank or hopper weighing, vibration may be imparted to the tank by associated machinery and transmitted to the weighing system. If the frequency of this transmitted vibration is at or near the resonant frequency of the weighing system the amplitude of vibration accordingly increases to a point where weight readings would become inaccurate, and if permitted to continue, may result in the rupture of hydraulic seals or other damage to the weighing system.

This problem is also present in the testing of jet or rocket engines since the amount of vibration encountered is generally considerable and the engines on a test stand pass through a number of dynamically changing frequencies before they arrive at a static thrust. As in tank weighing, vibratory frequencies at or close to the resonant frequency of the force measuring system will be reinforced to a point where readings will be inaccurate and the weighing system or test stand structure may itself be damaged. It is therefore very desirable that the resonant or natural frequency of the cell and system be kept out of the range of encountered vibration during such operations.

The natural frequency of a load cell system can be expressed by the formula for the natural frequency of a weight supported by a spring $$f = 187.7\sqrt{\frac{k}{w}}$$

where, $f$ = cycles per minute
$k$ = rate of spring in lbs. per inch
$w$ = weight in lbs.

A hydraulic load cell can be considered as a relatively stiff spring which is supporting a weight. In the above examples this would be the weight of the tank and contents, or in the case of engine testing the weight of the test stand and rocket. For a load cell of 100,000 lbs. capacity a deflection of the piston of .005″ would result in the following natural frequency for 50,000 lbs. of weight on the cell:

$k = 100,000 \div .005 = 20,000,000$ lbs. per inch $$f = 187.7\sqrt{\frac{20,000,000}{50,000}}$$

$f$ = approximately 6000 cycles per minute
$f$ = 100 cycles per second

From the above it will be apparent that the value of $k$ will be altered by a change in deflection of the load cell piston. With my hydroelectric load cell piston deflection is minimized, one factor being the elimination of long hydraulic lines, and the resonant frequency of the cell is increased accordingly. Thus, even without a restriction valve as shown in FIGURE 3, my hydroelectric load cell decreases the amount of required piston deflection and increases the natural frequency of the load cell. When combined with the restriction valve 24 as shown in FIGURE 2 "hashed" electrical signals are greatly reduced, as well as the natural frequency of the cell and system being variable.

As shown in FIGURES 1 and 2, variation of the natural or resonant frequency of my hydroelectric load cell is easily effected in operation by rotation of cable 54. It should be understood that movement of the tapered end 48 may be automatically controlled by selsyn motor 9 in response to system vibration. Remote control of the resonant frequency of the cell is desirable in such applications as jet or rocket engine testing, since personnel may not safely approach the test stand and load cell during engine operation.

Typically, during the testing of jet or rocket engines the resonant frequency of the load would be set at a high value during build up of engine thrust. If resonance is not encountered for the particular engine tested, the setting of restriction valve 24 need not be varied. If, however, resonance occurs, and particularly at a point of static thrust, the setting of the restriction valve may be changed to change the load cell resonant frequency. Specifically, movement of the rod 50 in valve closing direction will effect an increase in the resonant frequency of the load cell and movement of rod 50 in valve opening direction will effect a decrease in this resonant frequency. The rod 50 *acts during a condition of forced vibration,* i.e., when the cell is sensing the force exerted by a vibrating object, to choke or check high speed pressure variations and to impede the passage of such vibrations through it to the transducer, with the extent of such choking action approaching a maximum as the rod 50 approaches valve closing position and progressively diminishing with movement of the rod away from closing position. This choking action has the effect of isolating, to an extent dependent upon the extent of choking, the fluid on the transducer side of the rod 50 from that on the piston side so that the effective volume of the fluid undergoing compression by the loaded piston, and therefore the extent of deflection of the piston for a given load, is varied with variation of the setting of valve assembly 24. Variation of the extent of piston deflection of course correspondingly varies the spring rate $k$ and thereby varies the natural frequency of vibration of the load cell. Thus, my hydroelectric load cell can be tuned to different frequencies to avoid sustained operation at its resonant frequency.

In the embodiment shown in FIGURE 3, the resonant frequency of the weighing system is not variable. The resonant frequency is raised, however, to a higher value than would be obtained with long hydraulic lines and indicators, since piston deflection is reduced by a reduction of hydraulic fluid in the system. Thus, the load cell shown in FIGURE 3 may be used in applications wherein the vibratory frequencies to be encountered in operation are known and unlikely to change.

Further, the danger of hydraulic line leakage has been greatly minimized by the hydroelectric load cell of my invention since no external hydraulic lines are required to transmit the force or load information. Further, the hydraulic fluid in the system does not encounter varying ambient temperature conditions as is sometimes the case with long hydraulic lines wherein the cell fluid is at one temperature and fluid in the indicator line is at a different temperature, giving rise to error.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention, which, as a matter of language, might be said to fall therebetween.

Having described my invention, what I claim as new and desire to secure by Letters Patent is:

A force measuring system comprising, in combination, a support for positioning a load for free vertical movement, a hydraulic load cell supporting said load and said support, said load cell comprising a piston having means for receiving said load and said support, a base having means forming a cavity in its upper surface for holding a hydraulic fluid, a diaphragm overlying said base between said piston and said base, said diaphragm being secured to said base for containing hydraulic fluid under pressure, said piston being supported on said diaphragm by a pivotal support for transmitting a load on said piston to said diaphragm, an electrical transducer mounted on said base, said transducer having a pressure diaphragm and means connected to said transducer diaphragm for converting hydraulic pressure to an electrical signal output, said transducer having means forming a hydraulic fluid inlet in communication with said transducer diaphragm, means forming a constricted passage through said base from said cavity to said transducer inlet, a valve seat formed in said passage, a valve closure member movable toward and away from said valve seat, a valve control for moving said valve closure, means for operating said valve control located remotely from said load cell and an electrically operated indicator connected to the electrical output of said transducer, said readout instrument being located remotely from said load cell whereby a load on said load cell piston is transmitted to said diaphragm through said pivotal support to provide an increased hydraulic pressure output through said base passage to increase the pressure on said transducer diaphragm, converting hydraulic pressure from said load cell to an electrical output signal which is transmitted to said indicator.

References Cited by the Examiner

UNITED STATES PATENTS

| | | | |
|---|---|---|---|
| 1,957,894 | 5/1934 | Longenecher | 73—392 X |
| 2,897,675 | 8/1959 | Kocher et al. | 73—392 X |
| 2,924,964 | 2/1960 | Minke | 73—116 |
| 2,934,092 | 4/1960 | Saunders | 73—141 |
| 2,986,930 | 6/1961 | Price | 73—141 |
| 3,015,231 | 1/1962 | Ganahl | 73—116 |

OTHER REFERENCES

Pages 52–56, Elements of Mechanical Vibrations, by Freberg-Kemler, published by Wiley, 1947 (text book).

LOUIS R. PRINCE, *Primary Examiner.*

ROBERT EVANS, RICHARD C. QUEISSER,
*Examiners.*